No. 669,123. Patented Mar. 5, 1901.
H. C. OSBORN.
AUTOMATIC CHANGE SPEED GEARING.
(Application filed June 22, 1900.)
(No Model.)
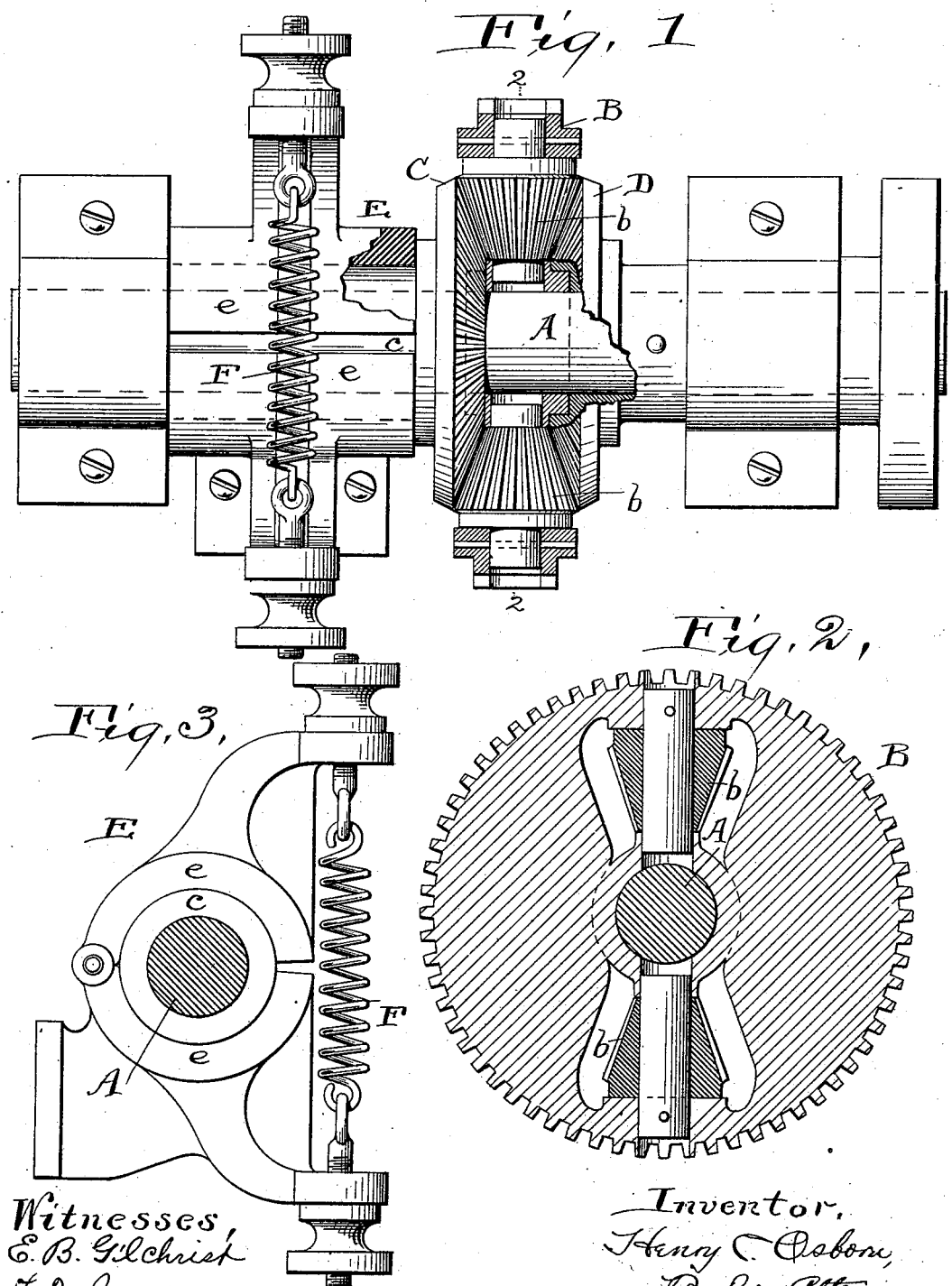
Witnesses
E. B. Gilchrist
F. D. Ammen
Inventor,
Henry C. Osborn,
By his Attorneys,
Thurston & Bates.

UNITED STATES PATENT OFFICE.

HENRY C. OSBORN, OF CLEVELAND, OHIO.

AUTOMATIC CHANGE-SPEED GEARING.

SPECIFICATION forming part of Letters Patent No. 669,123, dated March 5, 1901.

Application filed June 22, 1900. Serial No. 21,150. (No model.)

*To all whom it may concern:*

Be it known that I, HENRY C. OSBORN, a citizen of the United States, residing at Cleveland, in the county of Cuyahoga and State of Ohio, have invented a certain new and useful Improvement in Automatic Change-Speed Gearing, of which the following is a full, clear, and exact description, reference being had to the accompanying drawings.

The object of the invention is to produce gearing adapted for use as a part of power-transmission mechanism, whereby, although the speed of the driving member remains constant, the speed of the driven member will be varied as the resistance of the work varies.

The invention consists in the means I employ to accomplish this end, and comprises substantially the combination of a differential planetary gear adapted to drive two shafts at mutually-complementary speeds with a spring-actuated brake taking upon one of the said shafts and provided with means for regulating the force exerted by said spring.

In the drawings, Figure 1 is a plan view, partly in section, of change-speed gearing embodying my invention. Fig. 2 is a central sectional view on line 2 2 of Fig. 1, and Fig. 3 is an end view of the particular brake mechanism shown in Fig. 1.

I will now describe the particular embodiment of the invention which the drawings show.

A represents a shaft, and B a wheel loosely mounted thereon.

C and D are respectively independently-rotatable bevel-gears mounted in the same axial line with said wheel B and shaft A. The gear D is made fast to the shaft, while the bevel-gear C is loosely mounted thereon.

b b represent two bevel-gears which are loosely mounted on radial pins which are fast to the wheel B, and these bevel-gears mesh with the bevel-gears C and D.

It is apparent that if the wheel B is driven the shaft A will be rotated, provided the rotation of the gear C is resisted—that is, provided it is not entirely free to rotate substantially without friction of any sort. If, however, the rotation of this gear is retarded, the shaft A must rotate at some speed. In order to retard the rotation of the gear C, a brake E of some suitable construction must be provided. The brake shown in the drawings consists of two jaws e e, which are pivoted to a fixed support, which jaws embrace a hub c of the gear C. These jaws are caused to bind upon this hub with proper force by means of a spring F, preferably helical, whose ends are connected with the ends of said jaws. In order that the pressure of the jaws upon the gear-hub may be varied, means are provided for varying the tension of the spring. In the construction shown a threaded rod passes through these jaw-arms, and the ends of the spring engage in eyes on the inner ends of these rods. Thumb-nuts having milled heads, which screw onto the outer ends of the rods and bear against the arms e, permit the adjustment of the tension of this spring. If now the wheel B be driven and the resistance offered by the shaft A, which is to be connected suitably with the work, is equal to the resistance to rotation offered by the gear C, then the gear C, the gear D, the shaft A, and the wheel B will all rotate in unison. If the resistance to the rotation of the shaft A and gears be increased—as, for example, when the load or work is increased—the gear b will rotate when the wheel B is rotated, the result being that the shaft A will rotate at less speed than the wheel B. If the load on the shaft A be lightened, the gear b will rotate in the opposite direction, and the result will be that such shaft A will rotate more rapidly than the wheel B.

This mechanism is capable of a variety of uses; but it is designed especially to use as part of power-transmission machinery on motor-carriages. The driving mechanism of such a vehicle may be started at substantially the full speed without producing any injurious jar on the mechanism, because the shaft A will turn very slowly in overcoming the inertia of rest. If the load is increased by reaching a hill, the rotation of this shaft will be decreased in speed automatically. In adjusting this mechanism for this use the tension of the spring is adjusted until the resistance of the brake to the rotation of the gear C is substantially equal to the resistance to the rotation of the shaft A which will be offered when the vehicle is running on a smooth level road at a desired normal speed. When on bad roads or a hill, it is always desirable to decrease the speed, and this is accomplished automatically without any effort on the part of the driver because the resistance of the load increases and the speed of the shaft automatically decreases.

Having described my invention, I claim—

1. In combination with a planetary differential gear, a shaft and hub adapted to be driven at variable speeds thereby, a brake upon said hub, a spring actuating said brake, a threaded bolt carrying the end of said spring, and a nut for adjusting the same, substantially as described.

2. In combination with a planetary differential gear, a shaft and a hub adapted to be driven at variable speeds thereby, a brake consisting of two pivoted sections, a spring forcing said brake-sections toward each other, and means for adjusting said spring, substantially as described.

3. In combination with a planetary differential gear, a shaft and a hub adapted to be driven at variable speeds thereby, a brake having two pivoted sections, said sections having ears with openings therethrough, a helical spring in tension therebetween, eyebolts carrying the ends of said spring and having threaded shanks passing loosely through said openings, and nuts engaging said eyebolts, substantially as described.

In testimony whereof I hereunto affix my signature in the presence of two witnesses.

HENRY C. OSBORN.

Witnesses:
ALBERT H. BATES,
E. L. THURSTON.